(12) United States Patent
Marabese et al.

(10) Patent No.: US 10,124,643 B2
(45) Date of Patent: Nov. 13, 2018

(54) ELECTRONIC BRAKING DEVICE OF THE TILTING SYSTEM OF A VEHICLE WITH THREE OR MORE TILTING WHEELS

(71) Applicant: Quadro Vehicles S.A., Vacallo (CH)

(72) Inventors: Riccardo Marabese, Gallarate (IT); Marco Moroni, Marnate (IT)

(73) Assignee: Quadro Vehicles S.A., Vacallo (CH)

( * ) Notice: Subject to any disclaimer, the term of this patent is extended or adjusted under 35 U.S.C. 154(b) by 24 days.

(21) Appl. No.: 15/321,349

(22) PCT Filed: Jul. 4, 2014

(86) PCT No.: PCT/IB2014/062853
§ 371 (c)(1),
(2) Date: Dec. 22, 2016

(87) PCT Pub. No.: WO2016/001722
PCT Pub. Date: Jan. 7, 2016

(65) Prior Publication Data
US 2017/0174032 A1 Jun. 22, 2017

(51) Int. Cl.
*B60G 17/005* (2006.01)
*B60G 17/016* (2006.01)
(Continued)

(52) U.S. Cl.
CPC ....... *B60G 17/005* (2013.01); *B60G 17/0164* (2013.01); *B60G 21/007* (2013.01); *B60G 21/073* (2013.01); *B62K 5/10* (2013.01); *B60G 2204/4605* (2013.01); *B60G 2204/82* (2013.01); *B60G 2204/8304* (2013.01);
(Continued)

(58) Field of Classification Search
CPC .......................... B60G 17/005; B60G 21/073; B60G 17/0164; B60G 2400/38; B60G 2400/208; B60G 2400/051; B60G 2600/044; B60G 2204/8304; B60G 2204/82; B60G 2204/4605; B60G 2500/11; B60G 2400/33; B60G 2300/122
See application file for complete search history.

(56) References Cited

U.S. PATENT DOCUMENTS 2,743,941 A * 5/1956 Brooks ............. B60G 17/0152
280/5.509
RE39,477 E * 1/2007 Nellers .................... B60G 9/02
280/124.112
(Continued)

FOREIGN PATENT DOCUMENTS

DE 9414724 11/1994
EP 1362779 11/2003
(Continued)

*Primary Examiner* — Drew J Brown
(74) *Attorney, Agent, or Firm* — Stetina Brunda Garred & Brucker

(57) ABSTRACT

The present invention field relates to a braking device of the tilting system of vehicles that have at least three wheels and can lean sideways by virtue of the presence a so-called wheel tilting system. The device is characterized in that it comprises an electronic control unit adapted to receive and process a plurality of signals coming from devices capable of detecting parameters related to the instantaneous dynamic behavior of the vehicle and to selectively actuate said braking means.

8 Claims, 1 Drawing Sheet

(51) Int. Cl.
*B60G 21/00* (2006.01)
*B60G 21/073* (2006.01)
*B62K 5/10* (2013.01)
*B62K 25/04* (2006.01)

(52) U.S. Cl.
CPC .. *B60G 2300/122* (2013.01); *B60G 2300/124* (2013.01); *B60G 2300/45* (2013.01); *B60G 2400/051* (2013.01); *B60G 2400/0511* (2013.01); *B60G 2400/208* (2013.01); *B60G 2400/33* (2013.01); *B60G 2400/38* (2013.01); *B60G 2500/11* (2013.01); *B60G 2600/044* (2013.01); *B60G 2600/07* (2013.01); *B62K 2025/047* (2013.01)

(56) References Cited

U.S. PATENT DOCUMENTS

| | | | | |
|---|---|---|---|---|
| 8,141,890 B2 * | 3/2012 | Hughes | ............... | B60G 21/007 |
| | | | | 180/210 |
| 2008/0238005 A1 * | 10/2008 | James | ............. | B62D 9/02 |
| | | | | 280/5.509 |
| 2009/0026719 A1 * | 1/2009 | Koch | .................. | B60G 7/006 |
| | | | | 280/5.508 |
| 2009/0121448 A1 * | 5/2009 | Marabese | .......... | B60G 17/0162 |
| | | | | 280/124.112 |
| 2009/0174158 A1 * | 7/2009 | Anderson | .......... | B60G 17/0195 |
| | | | | 280/5.507 |
| 2010/0032915 A1 * | 2/2010 | Hsu | ........................ | B62H 1/12 |
| | | | | 280/5.509 |
| 2011/0095494 A1 * | 4/2011 | White | ................. | B60G 17/056 |
| | | | | 280/5.509 |
| 2013/0068550 A1 | 3/2013 | Gale | | |
| 2014/0312580 A1 * | 10/2014 | Gale | .................... | B60G 21/073 |
| | | | | 280/5.509 |
| 2018/0079275 A1 * | 3/2018 | Sawai | ............... | B60G 17/0565 |

FOREIGN PATENT DOCUMENTS

| | | | | |
|---|---|---|---|---|
| EP | 2046589 | 4/2009 | | |
| WO | 9727071 | 7/1997 | | |
| WO | WO-0136253 A1 * | 5/2001 | ............ | B60G 11/30 |
| WO | 0244008 | 6/2002 | | |
| WO | 2009087595 | 7/2009 | | |

* cited by examiner

ELECTRONIC BRAKING DEVICE OF THE TILTING SYSTEM OF A VEHICLE WITH THREE OR MORE TILTING WHEELS

CROSS REFERENCE TO RELATED APPLICATIONS

The present application claims priority to PCT International Application No. PCT/IB2014/062853 filed on Jul. 4, 2014, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to an electronic braking device of the tilting system of vehicles.

More in particular, it relates to vehicles which have at least three wheels and can lean sideways by virtue of the presence of a so-called wheel tilting system. The tilting wheels may be advantageously arranged along the same axle but may also be offset.

STATE OF THE PRIOR ART

As known in the prior art, the vehicles of the aforesaid type, in general, have three wheels, two of which, the front wheels, according to the most known constructions, are aligned on an axle and tilt by means of an either mechanical or hydraulic tilting system, depending on the case.

The present invention thus relates, in particular, to three-wheel vehicles, however the same invention may be effectively applied also to three-wheel vehicles in which at least two wheels are aligned with each other on a same axle. Indeed, the vehicle wheels could be reciprocally offset or coupled but not perfectly aligned along a same axle.

The operating principle of the tilting braking control system according to the present invention may indeed be effectively applied also in the case offset wheels, and may also apply to four-wheel tilting vehicles.

The prerogative of the vehicles with more than two wheels to which reference is made here is that of being able to lean sideways by a given angle towards the inside of a curve while cornering, exactly as a conventional two-wheel vehicle, motorcycle or bicycle.

In case of the three-wheel vehicles which are most common today (the known solutions of the prior art will be considered here by way of example), the tilting wheels are the two front wheels, which are coupled on the same axle.

The tilting function may be obtained on vehicles of known type by using a tilting mechanism, usually consisting of a system of levers which connect the hubs of the wheels paired along the same axle, which allows the wheels of one side of the vehicle to move upwards with respect to the vehicle and to the wheels of the other side to move downwards, again with respect to the vehicle, by the same measure.

In the typical configuration, this mechanism includes a shock absorber, including a spring and a damper, to absorb the irregularities of the ground and to control the longitudinal load transfers of the entire vehicle.

In the current form, said tilting mechanism is mechanical, with longitudinal or transverse arms and various layouts already known in the sector of automotive or motorcycle design.

One mechanism guides the vertical movement of the two wheels, a second mechanism couples the right wheel to the left wheel to make the descending movement of one wheel correspond to an equal ascending movement of the opposite wheel, a third mechanism connects both wheels to the shock absorber, a fourth mechanism (in case of front wheels) allows the steering to guide the vehicle.

Various tilting systems are known in the prior art. patent application WO-0244008-A2 discloses a four-wheel motorcycle with a coupling system between the left wheel and the right wheel consisting of linkage connections between each wheel and one pair of dual-cylinder central dampers.

At one or both of the pairs of wheels of the vehicle, EP-1362779-A2 shows one or more dampers directly between said wheels, or between said linkage system and a fixed point of the vehicle chassis.

DE-9414724-U1 shows two hydraulic cylinders independently connected at the two ends by means of pipes. Oil is present in the cylinders and can flow between them by means of pipes. Cylinder pistons divide the chambers of the cylinders into two parts, which are not communicating, so that the movement of the oil in the two upper cylinders corresponds to an opposite movement in the lower chambers.

WO-97127071 and WO-0244008-A2 show two hydraulic cylinders interdependently connected at the upper end by means of a pipe, with or without an accumulator connected to the pipe. The lower chambers under the pistons in the cylinders are empty and the pistons are free to move according to the motorcycle trim.

Finally, the Applicant is owner of European Patent EP 2 046 589 which relates to a hydro-pneumatic system comprising a pair of cylinders, one for each tilting wheel, in which the upper part of the cylinders contains oil, while the lower part contains gas.

In this type of vehicles, it is useful to equip the tilting system with a device which allows to brake the tilting, in order to allow to balance the vehicle avoiding the need for the driver to rest his or her feet on the ground, when standing at traffic lights, on city streets and/or without needing to use the traditional stand in case of prolonged vehicle stops.

Locking devices and systems of the tilting system are known in the prior art which employ a mechanical lock (e.g. a disc associated with a brake caliper), which may be actuated when the vehicle is stopped but also when the vehicle is moving, providing it is under a given speed, and which is automatically deactivated when a given engine rpm is exceeded, a few instants before the CVT clutch allows to restart the vehicle.

This locking system may also be deactivated by means of a button or other manual control at the driver's discretion.

However, these tilting locking systems of known type in the prior art are not free from problems and drawbacks.

A first drawback of the tilting locking systems of the type known in the prior art concerns the actuation of the braking system while standing at traffic lights. When the vehicle decelerates because it is approaching a red light, as mentioned the driver may engage the tilting locking system before the vehicle stops entirely. In this condition, the vehicle has not yet stopped and could encounter a pothole or a rough road surface situation, i.e. for the presence of a manhole or a difference of level, with the tilting system locked such to cause an imbalance to the right or left of the vehicle with respect to the vertical.

The automatic release of the locking system operates when resuming travel, and, as mentioned, releases the tilting locking system when a given engine rpm is reached, thus when accelerating the driver must correct the imbalance of the vehicle due to the presence of a difference of level or a manhole, for example. In order to correct such an imbalance, the driver must operate the steering with a movement which implies changing the rectilinear trajectory, with related risk of collision against a vehicle by the side or in all cases of invading the adjacent carriageway or lane.

Another drawback of the systems of known type is consequent to the manual actuation of the locking system. Indeed, a stepper actuator is normally provided between the manual actuation button of the mechanical locking system mechanical of the known type, and a few instants elapse before the system starts operating. This is a delay of several tenths of a second which however may cause drawbacks when driving.

Lastly, the tilting locking systems of the known type may only be manually released with the key inserted and the battery efficient; thus the tilting system of the vehicle remains locked if the battery is flat.

SUMMARY OF THE INVENTION

Consequently, the main task of the present invention consists in providing a braking device of the tilting system of vehicles with three or more wheels which solves the drawbacks illustrated above.

In particular, within such a task, it is the object of the present invention to provide a braking device of the tilting system vehicles with three or more wheels which can be activated either automatically according to the dynamic and/or static conditions of the vehicle, or manually by means of the user's intervention.

Another object of the present invention is to provide a braking device of the tilting system of vehicles with three or more wheels which cancels the actuating delay.

It is a further object of the present invention to provide a braking device of the tilting system of vehicles with three or more wheels which allows the gradual braking suited to the case of grip loss of the vehicle so as to increase vehicle stability and avoid falls or dangerous situations for the user in general.

This task and the other objects are reached by a hydropneumatic system according to appended claim 1.

Further features are described in the dependent claims.

BRIEF DESCRIPTION OF DRAWINGS

Further objects and advantages of the present invention will be apparent in the detailed description of an embodiment shown by way of non-limiting example in the accompanying FIG. 1, which shows an overview of the mechanical part of the locking device of the tilting system of a vehicle with more than two wheels according to the present invention.

DESCRIPTION OF THE PREFERRED EMBODIMENT

Figure 1:
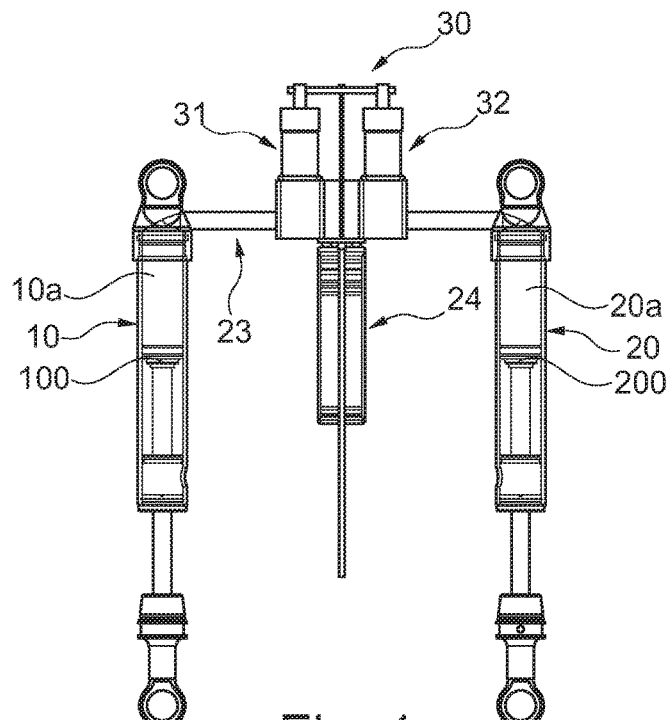
Figure 2:
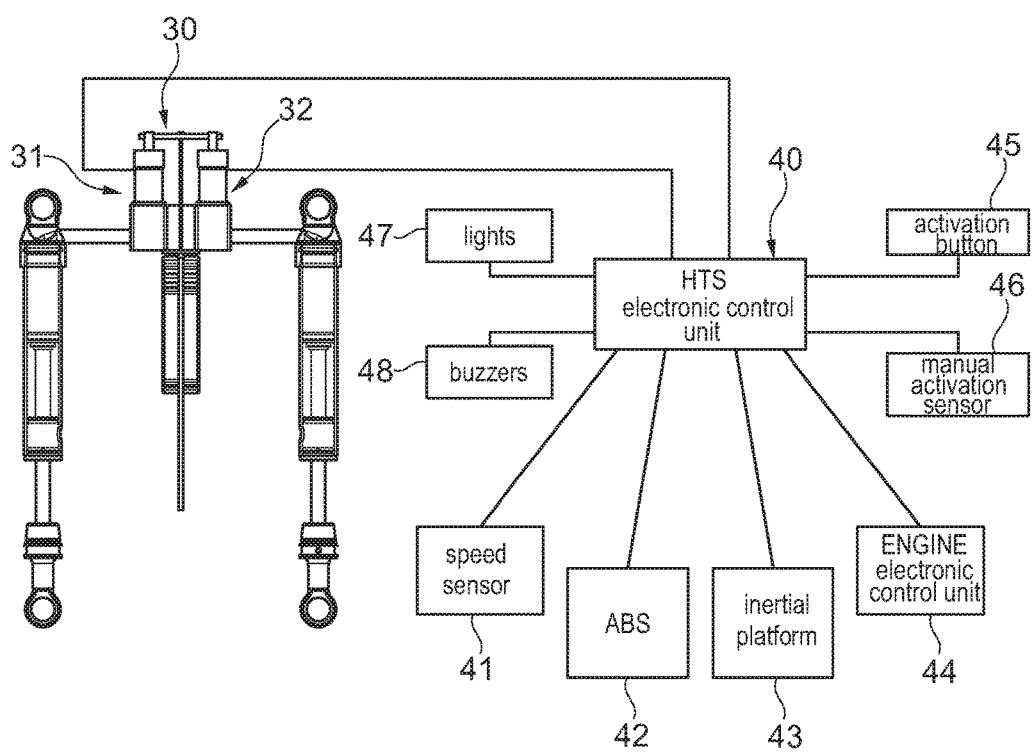
FIG. 2 shows an overview of the mechanical part and of the electronic control part of the locking device of the tilting system of a vehicle with more than two wheels according to the present invention.

A tilting system of a vehicle with more than two wheels to which the scope of the present invention refers comprises at least a first hydraulic cylinder 10 and a second hydraulic cylinder 20, set in fluid communication with each other by means of hydraulic connection means 23.

Said hydraulic connection means 23 may advantageously consist of a conduit, more preferably a pipe, which puts into hydraulic communication, in particular, the first 10a and second 20a upper chamber of said first 10 and second 20 hydraulic cylinder, respectively, in which oil is contained, as known from the hydraulic tilting system (HTS) developed by the same Applicant and object of European patent EP 2 046 589.

The first and second lower chamber of said first 10 and second 20 hydraulic cylinder, respectively, may advantageously contain pressurized gas, as patented by the same Applicant in EP 2 046 589, however the present tilting locking device may also be applied in all-hydraulic tilting systems.

When the vehicle leans, the piston corresponding to the wheel inside the curve, for example the first piston 100 associated with said first cylinder 10, pushes the oil contained in the first upper chamber 10a of the cylinder itself into the second upper chamber 20a of the opposite cylinder, in this case the second cylinder 20 by means of the connection pipe 23, thus moving the two wheels connected to the first 100 and second 200 piston in opposite directions.

A damper 24, with an end part hydraulically connected to the connection pipe 23, may be present. A rotary piston (or septums or baffles) is present in the damper 24 which forms a chamber which contains a pressurized gas, having a spring function. In case of rough terrain, which may cause a sudden movement of a single wheel, the movement of the fluid is partially damped by the accumulator, without immediately flowing towards the other wheel causing its immediate movement.

The tilting system locking device according to the present invention described above includes locking means 30 adapted to cut off the oil flow in said hydraulic connection means 23 following the movement of pistons 100 and 200.

Furthermore, said locking device comprises at least one central control unit 40 adapted to receive a plurality of signals from a plurality of detection devices 41, 42, 43, 44 adapted to detect and/or measure parameters related to the instantaneous hydraulic behavior of the vehicle and to transform them into signals for the central control unit 40, which preferably comprises an electronic control unit programmable with programs and threshold values defined for various parameters, configured to receive and process one or more signals coming from said devices 41, 42, 43 and 44 and to selectively actuate said braking means 30. By way of non-limiting example of the present invention, said central control unit 40 interfaces with a first device 41 adapted to measure the (rotational) speed of the wheels, a second device 42 adapted to control the braking of the wheels (ABS), a gyroscope 43 adapted to detect tilt and acceleration of the vehicle, a third device 44 or gauge adapted manage the engine, in terms of power, rpm increase or decrease, and so forth.

The grip conditions of the wheels on the ground can be detected by virtue of the aforesaid devices.

In particular, a decrease of centrifuge acceleration denotes a loss of grip on curves. Said central control unit 40 thus receives signals from the devices 41, 42, 43 and 44 described above by detecting the dynamic condition of the vehicle, and sends a control signal to said tilting system braking means 30, thus adjusting its operation.

More in particular, said braking means may advantageously, but not limitingly comprise at least one solenoid valve set on said hydraulic connection means 23, preferably two solenoid valves 31, 32 set on said hydraulic connection means 23.

Two solenoid valves, each set between said damper 24 and a hydraulic cylinder 10, 20, are advantageously provided in the configuration in which the damper 24 is provided.

Said at least one solenoid valve, in addition to being electrically controlled by the central control unit by means of an electric signal, may be advantageously also manually activated for parking, e.g. by means of a lever control which may be actuated directly by the driver.

When the vehicle is moving, the central control unit 40 may, when either controlled by the driver or in fully automatic manner, operate on said locking means 30, i.e. on said at least one, preferably two solenoid valves 31, 32 by either partially or totally closing the valves, i.e. braking the oil flow from one of the cylinders 100 and/or 200 to the other.

The control unit 40 may determine, by processing of the signals coming from the devices 41, 42, 43, 44, whether the vehicle is decelerating to stop, accelerating, traveling under a given value threshold speed, balanced, loosing grip, and all engine conditions (rpm, throttle opening etc.).

If these conditions are satisfied, the control unit 40 may advantageously activate a light signal, e.g. a warning light on the dashboard, to warn the user that, if desirable because, for example, the vehicle is approaching a traffic light where it will need to stop, he or she may engage the tilting locking system.

In a fully automatic operating mode, the control unit may automatically send the signal to the tilting locking system when the stopping of the vehicle is recorded, an instant before stopping, without needing enabling by the driver.

Advantageously, first visual means 46, for example, a first warning light, which indicate the manual activation of the locking device by the driver during parking, manual activation means 45, which may be activated by the driver (for example a button, a lever), second visual means 47, for example a second warning light, which indicate activated system condition, auditory warning means 48, for example the horn of the vehicle itself, may be connected to said central control unit 40.

By virtue of these further systems, the driver is warned by the first visual means 46 when the locking system can be inserted because the speed, inclination and dynamic conditions of the vehicle, in general, allow to actuate the tilting lock; the driver is further warned, at least visually, by said visual means 47 that the tilting locking device is engaged.

For example, in case of manual actuation of the locking means 30 by means of a lever, for example when the vehicle is parked, the user may be advantageously warned by the auditory warning means 48 or also by an auditory signal emitted by the horn.

By virtue of the central control unit 40 which processes the signals from the sensor means adapted to measure parameters related to the dynamic behavior of the vehicle, the tilting may be locked by the device according to the present invention only in given conditions, and dangerous situations are avoided, in manner as cannot be achieved with mechanical systems of known type.

In particular, if the control unit detects a situation in which the driver is holding the manual locking device insertion button pressed, thus preventing the automatic release, should the driver suddenly accelerate, the control unit, by means of the device 44, can remedy by removing power from the engine.

Alternatively, the control unit can deactivate the tilting lock manual actuation button if a dangerous situation is detected and release the system if the lock is already engaged.

The braking device of the tilting system of a vehicle with three or more wheels according to the present invention thus reaches the predetermined tasks and objects.

In particular, the device may work as dynamic device for the vehicle stability control, solving potentially dangerous situations in a timely manner, for example the operation of the known braking device while standing at a traffic light on rough terrain or in situations in which the driver wants to accelerate the vehicle while the locking device insertion button is pressed, and in the case of grip loss when cornering or on a rectilinear stretch, for example.

Furthermore, the tilting system braking device according to the present invention has many advantages when used for parking. Indeed, by virtue of the manual actuation, the system may be activated or deactivated also if the battery is flat or in electric system blackout conditions, and the device may warn the user of each activation of the lock by virtue of the electronic control unit and the visual and auditory warning means.

An important advantage which may be reached by the locking device according to the present invention is in the engagement speed of the locking system, which is reduced to a few hundredths of a second by virtue of the activation of solenoid valves as locking means with respect to the tenths of a second needed with the locking means of known type.

By virtue of the actuating rapidity of the solenoid valves as braking means, the device according to the present invention may be used according to control logics which are entirely unknown in the locking devices of known type of the prior art. In particular, the control unit may intervene in timely manner to adjust tilting and improve vehicle stability control in grip loss conditions of the vehicle so as to increase stability and avoid falls, and equally rapidly it may restore tilting when the control unit detects a dynamic condition of restored grip of the vehicle.

Many changes, modifications, variations and other uses and applications of the subject invention will be apparent to a person skilled in the art after having considered the description and the accompanying drawings which illustrate preferred embodiments thereof. Such changes, modifications, variations and other uses and applications which do not differ from the scope of the invention as defined in the appended claims and form an integral part of the text are covered by the present invention.

The invention claimed is:

1. A braking device of the tilting system of a vehicle with more than two wheels, said vehicle having at least two wheels which tilt by means of said tilting system, the tilting system comprising at least a first hydraulic cylinder and a second hydraulic cylinder, each associated with a respective tilting wheel of the vehicle, said first and second hydraulic cylinder comprising a first and a second upper chamber containing oil, respectively, said first and second chamber being hydraulically connected to each other by a connection pipe, said braking device comprising braking means adapted to selectively either prevent or allow the oil flow in said hydraulic connection means and at least one central control unit and one or more detection devices, said central control unit being connected to said braking means and configured to receive and process one or more signals coming from said detection devices and to selectively actuate said braking means, wherein said braking means comprises a damper with an end part hydraulically connected to said connection pipe and a rotary piston present in the damper, said braking means additionally comprising at least two solenoid valves set on said hydraulic connection means, with at least one of said solenoid valves being set between said damper and the first hydraulic cylinder and at least one of said solenoid valves being set between said damper and said second hydraulic cylinder.

2. The braking device according to claim 1, wherein said one or more detection devices comprises a first detection device adapted to measure the speed of the wheels.

3. The braking device according to claim 1, wherein said one or more detection devices comprises a second detection device adapted to adjust the braking of the wheels (ABS).

4. The braking device according to claim 1, wherein said one or more detection devices comprises a gyroscope adapted to detect the leaning and acceleration of the vehicle.

5. The braking device according, to claim 1, wherein said one or more detection devices comprises a third device adapted to manage the engine.

6. The braking device according to claim 1, further comprising a first visual means adapted to signal the activation of the manual parking lock device by the driver and a manual activation means for manually activating the locking device by the user, the manual activation means being connected to said central control unit.

7. The braking device according to claim 6, further comprising a second visual means adapted to signal an activated condition of the locking device to the user.

8. The braking device according to claim 6, further comprising an auditory warning means adapted to signal the activated condition of the locking device to the user.

* * * * *